United States Patent
Subbiah

(10) Patent No.: US 9,694,614 B2
(45) Date of Patent: Jul. 4, 2017

(54) PRINTED PUBLICATION WITH A DIGITAL FILE ENHANCER FROM AN AFFIXED CHIP

(71) Applicant: INTERNATIONAL BUSINESS MACHINES CORPORATION, Armonk, NY (US)

(72) Inventor: Manoth K. Subbiah, Perungudi (IN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/320,919

(22) Filed: Jul. 1, 2014

(65) Prior Publication Data
US 2016/0007002 A1    Jan. 7, 2016

(51) Int. Cl.
 G06F 17/00  (2006.01)
 B42D 1/00   (2006.01)
 H04N 5/765  (2006.01)
 H04N 5/907  (2006.01)

(52) U.S. Cl.
 CPC ............... *B42D 1/00* (2013.01); *H04N 5/765* (2013.01); *H04N 5/907* (2013.01)

(58) Field of Classification Search
 USPC ................. 235/375, 486; 340/10.1, 10.4
 See application file for complete search history.

(56) References Cited

U.S. PATENT DOCUMENTS

| | | | |
|---|---|---|---|
| 6,386,453 B1* | 5/2002 | Russell | G06Q 10/10 235/375 |
| 6,466,329 B1* | 10/2002 | Mukai | H04N 1/00355 358/1.13 |
| 6,585,154 B1 | 7/2003 | Ostrover et al. | |
| 7,905,415 B2 | 3/2011 | Basson et al. | |
| 8,116,582 B2* | 2/2012 | Erol | 382/162 |
| 8,181,848 B2 | 5/2012 | Olmsted et al. | |
| 8,495,061 B1* | 7/2013 | Lifantsev | G06F 17/30722 707/713 |
| 2006/0238344 A1* | 10/2006 | Kubby | G06K 19/07758 340/572.1 |
| 2007/0090954 A1* | 4/2007 | Mahaffey | G06K 19/07327 340/572.3 |
| 2011/0283369 A1* | 11/2011 | Green | G06K 19/10 726/30 |
| 2012/0155700 A1* | 6/2012 | Huang | H04N 1/32138 382/100 |

* cited by examiner

*Primary Examiner* — Ahshik Kim
(74) *Attorney, Agent, or Firm* — John R. Pivnichny; Law Offices of Jim Boice

(57) ABSTRACT

A printed publication comprise: a plurality of printed pages, wherein multiple written articles are printed on one or more of the printed pages; a microchip affixed to the printed publication, wherein the microchip comprises multiple digital files, wherein each of the multiple digital files is a digital file enhancer that is related to a specific written article from the multiple written articles; a positioning structure, wherein the positioning structure enables a positioning structure device to determine which written article from the printed pages is currently visible to a user; a correlating hardware logic, wherein the correlating hardware logic correlates a specific digital file, from the multiple digital files, with the written article that is currently visible to the user to identify a relevant digital file from the microchip; and a transceiver, wherein the transceiver transmits the relevant digital file from the microchip to a receiving device.

20 Claims, 4 Drawing Sheets

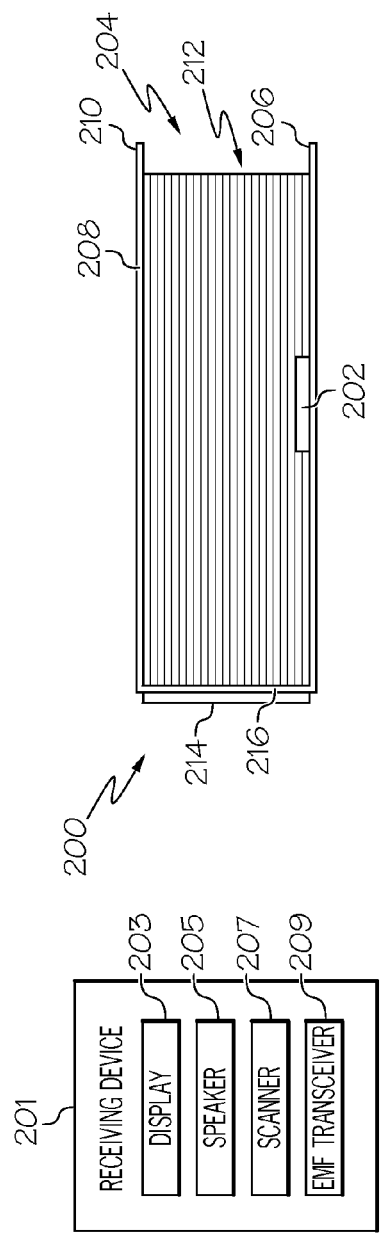
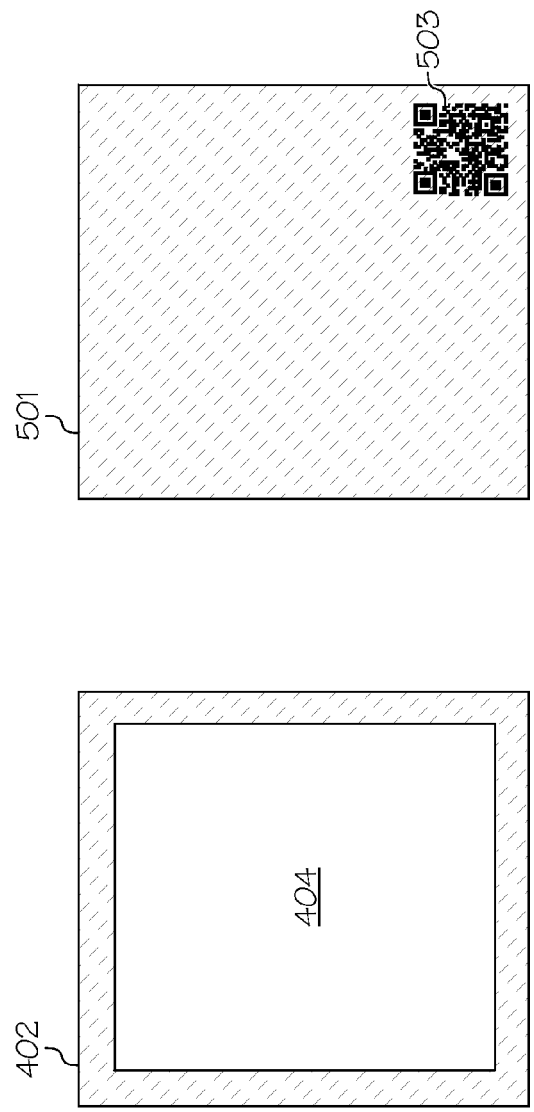

PRINTED PUBLICATION WITH A DIGITAL FILE ENHANCER FROM AN AFFIXED CHIP

BACKGROUND

The present disclosure relates to the field of digital storage devices, and specifically to digital storage devices that are microchips. Still more particularly, the present disclosure relates to microchips that contain digital files that are related to a printed publication to which the microchip is affixed.

Books, magazines, and other printed materials (i.e., text/photos that are printed on paper) are still a popular alternative to electronic content, such as that found on an e-reader, a laptop/tablet computer, etc. Books do not rely on batteries being charged, are inexpensive, can be easily read in bright sunlight, etc. However, books, magazines, and other printed materials do not provide sound, movies, clips, and other information that are often associated with electronic content, such as content that can be retrieved from embedded hyperlinks in a website.

SUMMARY

In one embodiment of the present invention, a printed publication comprises: a plurality of printed pages, wherein multiple written articles are printed on one or more of the printed pages; a microchip affixed to the printed publication, wherein the microchip comprises multiple digital files, wherein each of the multiple digital files is a digital file enhancer that is related to a specific written article from the multiple written articles; a positioning structure, wherein the positioning structure enables a positioning structure device to determine which written article from the printed pages is currently visible to a user; a correlating hardware logic, wherein the correlating hardware logic correlates a specific digital file, from the multiple digital files, with the written article that is currently visible to the user to identify a relevant digital file from the microchip; and a transceiver, wherein the transceiver transmits the relevant digital file from the microchip to a receiving device.

In one embodiment of the present invention, a method and/or computer program product retrieves a digital file that is relevant to a written article. A positioning structure determines which written article from the printed pages of a printed publication is currently visible to the user. A correlating hardware logic correlates the specific digital file, from the multiple digital files, with the written article that is currently visible to the user to identify the relevant digital file from the microchip. A transceiver transmits the relevant digital file from the microchip to a receiving device.

BRIEF DESCRIPTION OF THE SEVERAL VIEWS OF THE DRAWINGS

FIG. 2 depicts an exemplary printed publication that has a microchip, containing digital files related to one or more printed articles in the printed publication, affixed thereto;

FIG. 4 depicts a sheet from the pages in the printed publication having a semi-transparent electromagnetic field (EMF) shield that permits some, but not all, EMF radiation to pass through it;

FIG. 5 depicts a sheet from the pages in the printed publication having an exemplary matrix barcode that identifies a page number and/or article name for a written article that is found on a specific page in the printed publication.

DETAILED DESCRIPTION

Figure 1:
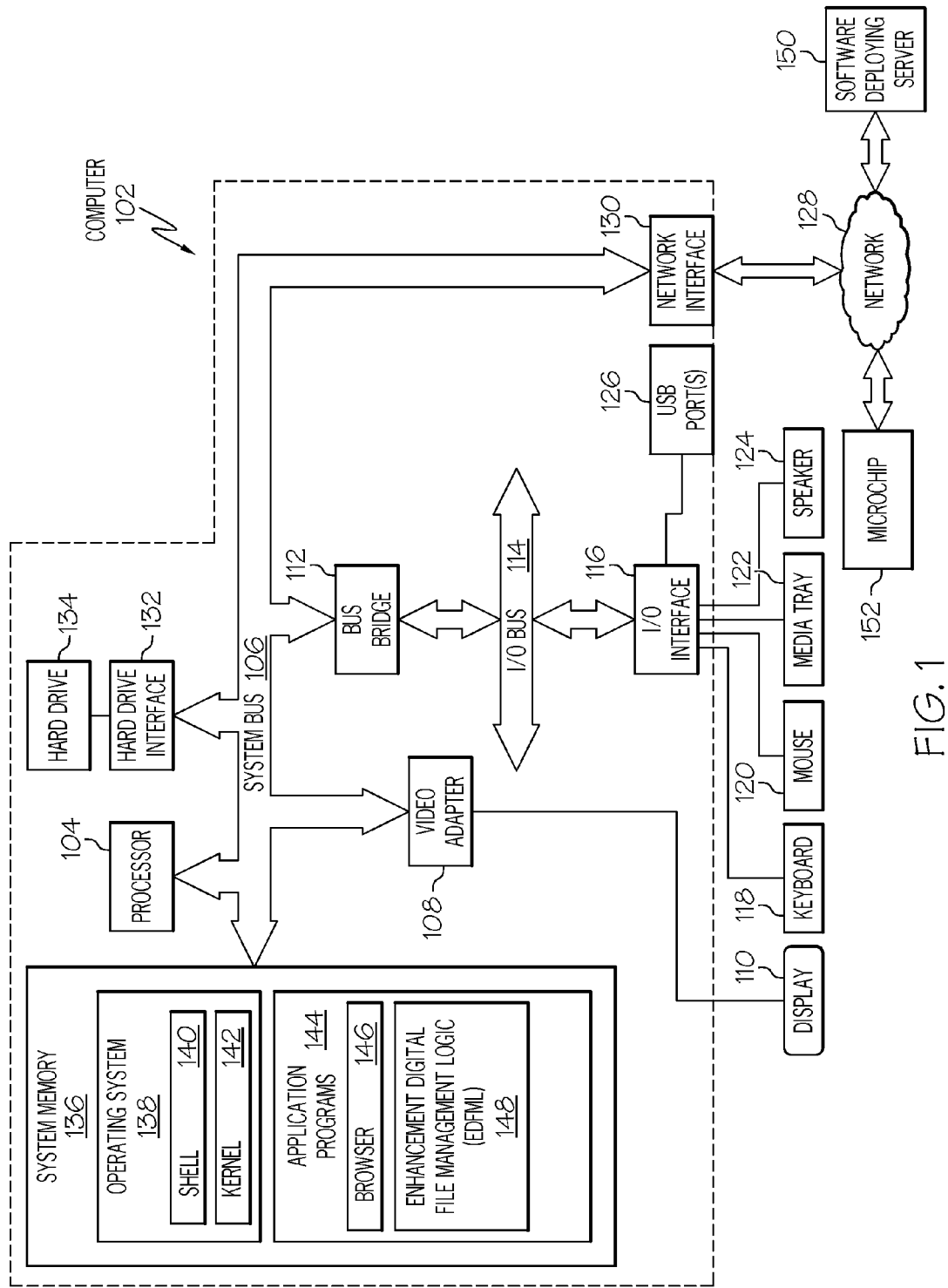
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or microchip 152 and/or receiving device 201 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Enhancement Digital File Management Logic (EDFML) 148. EDFML 148 includes code for implementing the processes described below, including those described in FIG. 2-6. In one embodiment, computer 102 is able to download EDFML 148 from software deploying server 150, including in an on-demand basis, wherein the code in EDFML 148 is not downloaded until needed for execution. Note further that, in one embodiment of the present invention, software deploying server 150 performs all of the functions associated with the present invention (including execution of EDFML 148), thus freeing computer 102 from having to use its own internal computing resources to execute EDFML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary and novel printed publication 200, that has a novel microchip 202 affixed thereto, as utilized in one or more embodiments of the present invention is presented. As described herein, the microchip 202 contains digital files related to one or more printed articles in the printed publication 200. In a preferred embodiment, the microchip 202 works in conjunction with a receiving device 201 (see also FIG. 3), such as a smart phone, a tablet computer, etc., that has a display 203 (e.g., display 110 shown in FIG. 1) capable of displaying electronic information such as videos, and/or a speaker 205 (e.g., speaker 124 shown in FIG. 1) capable of displaying music, etc.

Figure 3:
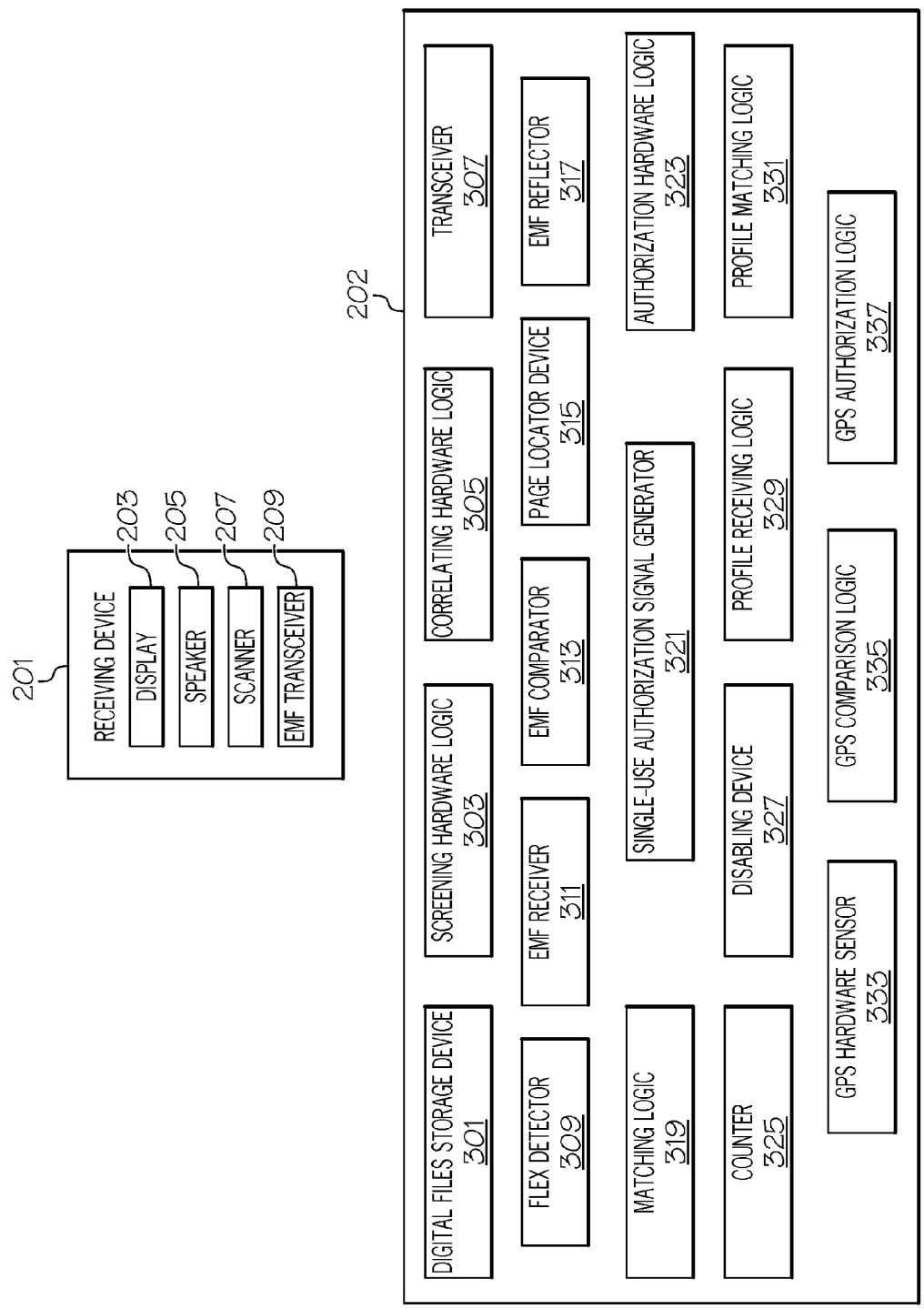
FIG. 3 illustrates additional detail of one or more embodiments of the microchip depicted in FIG. 2.

Microchip 202 is an electronic device that is capable of storing digital files. Additional details of one or more exemplary embodiments of microchip 202 are depicted in FIG. 3. As an overview, microchip 202 includes, but is not limited to, a small storage component (e.g., a memory), a buffer, a near-field-communication (NFC) transceiver (i.e., a device capable of sending and receiving electromagnetic signals such as radio waves, infrared light, etc. within a limited range), and/or a positioning device (e.g., a global positioning system—GPS system).

As depicted in FIG. 2, printed publication 200 includes a plurality of printed pages, depicted as pages 204. Thus, printed publication 200 may be a book, a magazine, or any other printed publication that has multiple pages. Note that printed publication 200, as its name suggests, is not an electronic device (e.g., an e-reader, a table computer, etc.) on which documents are displayed, but rather has non-electronic pages (e.g., paper) on which is printed (e.g., with ink) text, photos, graphics, etc. In an exemplary embodiment of the present invention, there are multiple written articles printed on one or more of the printed pages 204. That is, each of the pages 204 has one or more written articles (i.e., essays, stories, reports, etc.) printed thereon. Of course, a particular written article may span multiple pages, either contiguously (i.e., the next page continues the written article) or non-contiguously (i.e., where a next page of the article is found on a page that is several/many pages away from where the article left off).

In one or more embodiments of the present invention, the microchip 202 is physically affixed to the printed publication 200, as depicted in FIG. 2. In one or more embodiments of the present invention, the microchip 200 is mounted on and/or embedded into and/or printed on and/or interwoven into a particular predefined location, such as the back cover 206 of the printed publication 200. The microchip 202 holds multiple digital files (e.g., in a digital files storage device 301 shown in FIG. 3). One or more of these multiple digital files is a digital file enhancer that is related to a specific written article from the multiple written articles. For example, assume that an article on page 100 of printed publication 200 is about taking a vacation in Paris. The related digital file(s) stored in microchip 202 may be a moving video clip (e.g., a Moving Pictures Expert Group—MPEG file) of riding the Paris Metro, or an audio clip (e.g., an MPEG-2 Audio Layer III—MP3 file) of Parisian music, or a still photo (e.g., a Joint Photographic Experts Group—JPEG file) of the Eiffel Tower, etc.

Note that in a preferred embodiment, the digital file stored within the microchip is not merely an audio version of the printed text found in the related article from the printed publication 200. That is, the digital file provides enhanced and/or additional information, in audio or video form, related to what is written in the written article. Thus, in one embodiment information found in the digital file is additional information (video, sound) that is not found in the written article. As such, the digital files are not mere transcriptions of the written article(s) themselves. In one embodiment of the present invention, the microchip 202 contains only video files that are related to the multiple written articles in the printed publication 200. In another embodiment of the present invention, the microchip 202 contains only advertisements that are related to the multiple written articles in the printed publication 200.

In one embodiment of the present invention, an audio copy of the written article is expressly blocked from being stored in the microchip 202 by screening logic (e.g., screening hardware logic 303 depicted in FIG. 3) within the microchip 200. That is, if logic within the microchip 202 determines that an attempt is being made to store a digital file within the microchip 202, which is merely an audio version of the written article, storage of this digital file within the microchip 202 is blocked by the screening hardware logic 303. The screen hardware logic 303 is able to determine that a digital file, for which an attempt to store it within the microchip 202 is being made, is merely an audio version of the written article based on a tag or other metadata describing the digital file that is attempted to be loaded onto the microchip 202.

Another component of the printed publication 200 is a positioning structure, which is described in various embodiments herein (e.g., see FIG. 4 and FIG. 5 below). In any embodiment, the positioning structure enables a positioning structure device to determine which written article from the printed pages is currently visible to a user. That is, the positioning structure is used to identify the page to which the printed publication 200 has been opened (e.g., page 100 from a 250 page book).

Another component of the printed publication 200 is a correlating hardware logic (e.g., correlating hardware logic 305 shown in FIG. 3). This correlating hardware logic correlates a specific digital file, from the multiple digital files, with the written article that is currently visible to the user, in order to identify a relevant digital file from the microchip. That is, the correlating hardware logic 1) takes the page number and/or name of the article that is currently visible to the user who is reading the article, and 2) correlates that article with one or more digital files stored within the microchip 202, which are relevant to that article. In one embodiment, this relevance is determined by a flag or similar marker, which matches each digital file within the microchip 202 to one or more written articles within the printed publication 200.

Another component of the printed publication 200 is a transceiver, such as transceiver 307 shown in FIG. 3. In one or more embodiments, this transceiver transmits the relevant digital file from the microchip 202 to receiving device 201 having the display 203 and/or speaker 205. Thus, information found in the relevant digital file, but not found in the written article itself, is wirelessly transmitted to the receiving device, where it is played (as a video or a sound).

As will be described in further detail below, in one embodiment the printed publication 200 has an electromagnetic field (EMF) shield 208 (e.g., a radiofrequency—RF shield) that prevents EMF/RF signals from reaching the microchip 202. In one embodiment, the EMF shield 208 is embedded within the cover 210 of the printed publication 200. This affords partial shielding of the microchip 202, since the cover 210 does not fully enclose the entire printed publication 200. However, as described herein, in one embodiment this partial shielding is sufficient to prevent interrogation by the receiving device 201 (e.g., if the EMF radiation is weak enough). However, in one embodiment, additional EMF/RF shielding may be needed, which is provided by an EMF shield coating 212 on the non-bound edges of the pages 204.

As will be described in further detail below, in one embodiment the printed publication 200 has a strain gauge 214, which is affixed to a spine 216 of the printed publication 200. As the printed publication 200 is turned to a different page from the pages 204, the spine 216 will flex in a consistent manner. The strain gauge 214 measures these flexing motions, in order to generate a signal that is sent to a flex detector (e.g., flex detector 309 in FIG. 3) in the microchip 202.

In one embodiment of the present invention, the positioning structure discussed above (for determining which page the magazine/book is opened to) utilizes a semi-transparent electromagnetic field (EMF) shield that permits some, but not all, EMF to pass through it. That is, consider now FIG. 4, in which a page 402 from the pages in the book/magazine (printed publication 200) has a coating 404 that is an electromagnetic field (EMF) shield. This coating 404 allows a predetermined level of EMF to pass through. That is, when EMF radiation, such as RF electromagnetic (EM) waves ("RF waves"), hit the coating 404, a predetermined percentage (e.g., 90%) of the RF waves are allowed to pass through, while the rest (e.g., 10%) are blocked. Assume now that there are ten pages in the book/magazine, and that each one has a coating 404 that allows 90% of incoming RF waves to pass through. Assume further that the ten pages are stacked one on top of another. Thus, the top page allows 90% of the RF waves to pass through. The second page (just below the top page) allows 90% of the 90% that passed through the top page to pass through, such that 81% (0.9×0.9) of the original RF wave passes through the second page. Likewise, the third page (just below the second page) allows 90% of the 81% that passed through the second page to pass through, such that 73% (0.9×0.81) of the original RF wave passes through the third page. Thus, measuring what percentage of the original RF wave passes through a particular page/sheet can produce a value indicative of which page is being read. That is, if the microchip 202 mounted on the bottom (back cover) of a magazine detects 73% of the original RF wave, then the system will know that the original RF wave has passed through three coatings 404. By knowing which pages/sheets (if not all) have this coating, then the system knows to which page the magazine has been opened.

In one embodiment, coating 404 is actually a coating of specifically designed to be 1) thin enough to be visually translucent (such that writing underneath the coating 404 can be read), while 2) having enough ferromagnetic material in the coating 404 to block the EMF/RF radiation. In this embodiment, the coating is actually applied to one or more pages/sheets in the printed publication 200.

In one embodiment, no coating needs to be applied to each sheet/page, since each sheet/page in the book/magazine is made of material that has inherent EMF/RF shielding properties. That is, in this embodiment the paper and/or ink used to print the text/figures on each page/sheet is designed to have EMF/RF shielding properties, even if very slight. Thus, certain papers/inks may have enough EMF/RF shielding components embedded within to alter how much EMF/RF radiation can pass through. For example, a trace amount of ferromagnetic material within the paper and/or ink is enough to act as a slight EMF/RF shield.

Thus, whether the EMF/RF shielding is from an actual coating on a page/sheet or from properties of the page/sheet/ink itself, in one embodiment and as depicted in FIG. 3 there is an EMF receiver 311 in the microchip 202, which detects EMF radiation (e.g., RF signals/waves) that have passed through the pages 204, and more specifically the coating(s) 404 (whether actual coatings or inherent properties of the page/sheet/ink).

As depicted in FIG. 3, an EMF comparator 313 in the microchip 202 is able to compare a level of EMF radiation received at the microchip with a predetermined level of EMF radiation (e.g., a known level of EMF radiation that is produced by a device such as the receiving device 201 (shown in FIG. 2) when placed on an open page in the magazine/book) in order to determine how many pages the initial EMF signal (i.e., EMF radiation) passed through. As described in the example above, if 73% of the initial EMF signal originating from the source (e.g., receiving device 201) is detected by the EMF receiver 311, the EMF comparator 313 is able to calculate the number of pages/sheets/coatings that the EMF radiation has passed through.

A page locator device 315, depicted in FIG. 3, then utilizes a determined quantity of pages that the initial EMF signal passed through in order to identify the written article that is currently visible to the user. That is, once it is known how many pages the EMF radiation/signal has passed through to get to the microchip 202, then the page locator device 315 calculates which page the magazine/book is open to.

In one embodiment of the present invention, a printed symbol on a page is used to identify which article is visible to (and thus presumably being read by) the user. In one embodiment, this printed symbol is merely a page number on which the written article appears, or is a title of the written article, either of which can be read by optical character recognition (OCR) capabilities within a smart phone (e.g., a scanner 207 in the receiving device 201 shown in FIG. 2), thereby identifying which article is being shown to the user. However, in another embodiment, the printed symbol is an optically readable (e.g., by receiving device 201 using the scanner 207) visual code, such as a matrix barcode 503 printed on a page 501, as shown in FIG. 5. Thus, by scanning the matrix barcode 503, the microchip 202 knows which article is being presented to a user, and thus allows the correlating hardware logic 305 to retrieve the appropriate digital file for the written article currently being presented/viewed/read. Thus, the printed symbol on a printed page from the printed pages in the printed publication, which provides an article identifier of the written article that is currently visible to the user, enables the article identifier to be transmitted to the microchip in order to retrieve the relevant digital file from the microchip.

In one embodiment of the present invention, identifying which page is currently being opened to is performed using EMF reflectors and timing detectors. For example, assume that an EMF transceiver 209 (shown in receiving device 201 in FIG. 2) is placed against a page on which a specific written article is printed. Assume further that the EMF transceiver 209 transmits an initial EMF signal. In this embodiment, an EMF reflector 317 in the microchip 202 will bounce the EMF signal back to the EMF transceiver 209, such that a delay in time between the EMF transceiver 209 sending that initial EMF signal to the microchip 202 (and more specifically the EMF reflector 317) and the EMF transceiver 209 receiving a reflected EMF signal back from the microchip 202 identifies a distance between the EMF transceiver 209 (within the receiving device 201) and the microchip 202. This allows the system to identify the page on which the receiving device 201 is resting (and thus specific written article is located), thus enabling the microchip 202 to retrieve the relevant digital file from the digital files storage device 301. EMF reflector 317 is composed of any material (e.g., a metal such as aluminum) capable of reflecting EMF radiation.

Thus, by measuring how long it takes for the EMF signal to be sent to and bounced back from the EMF reflector 317 in the microchip 202, the distance between the page on which the receiving device 201 is resting and the microchip 202 affixed to the back cover of the magazine/book can be calculated. Since this distance is highly exact, the page number of the sheet/page on which the receiving device 201 is resting can be calculated by the page locator device 315, thus directing a component (e.g., a matching logic 319) to identify the appropriate digital file for the page/article that is currently being shown to the user.

In one embodiment of the present invention, the microchip 202 includes a single-use authorization signal generator 321, as shown in FIG. 3. This single-use authorization signal generator 321 generates a single-use authorization signal that is transmitted to the receiving device 201. The microchip 202 also includes an authorization hardware logic 323. This authorization hardware logic 323 subsequently receives a combination signal from the receiving device 201. This combination signal combines the single-use authorization signal with a unique identifier of the receiving device. That is, the combination signal includes both the single-use authorization signal that was initially generated by the microchip, with a unique identifier (e.g., a UUID, which identifies the receiving device 201, and/or the user of the receiving device 201, with a unique number). The microchip 202 then releases data, including digital files, from the microchip 202 only to the receiving device 201 that has sent the combination signal. That is, in one embodiment the combination signal from the receiving device includes a special access code that is derived from the single-use authorization signal and the UUID of the receiving device. The authorization hardware logic 323 includes circuitry that appends the special access code to the digital files being transmitted, such that only the receiving device 201 that created the special access code can receive and/or utilize (e.g., decrypt, if the special access code is an encryption key) the digital file being sent from the microchip 202.

As depicted in FIG. 2, in one embodiment of the present invention the printed publication 202 has a cover 210. Affixed to the cover 210 is an electromagnetic field (EMF) shield 208, which blocks EMF access to the microchip when the cover is closed. As noted above, in one embodiment the EMF shield 208 is embedded within the cover 210 of the printed publication 200. For example, the cover 210 may have an interwoven layer of metallic material, which blocks EMF radiation. However, if only the cover 210 has such EMF protection/blocking, then some EMF radiation may still enter through the top and sides of the magazine/book that are not directly protected by the cover 210. Even so, this partial shielding of the microchip 202 may be sufficient to prevent interrogation by the receiving device 201, if the EMF radiation is not too strong (less than a predefined level) and the EMF detector (e.g., EMF receiver 311 shown in FIG. 3) is insensitive enough (incapable of detecting EMF radiation below a predefined level). However, in one embodiment, additional EMF/RF shielding may be needed, which is provided by an EMF shield coating 212 on the non-bound edges of the pages 204 (i.e., the top, bottom, and side edges of the pages in the book/magazine).

In any embodiment in which the book/magazine is protected by an outside EMF/RF shield (in the cover/edges), if the EMF/RF shield is sufficient, then the microchip 202 cannot be interrogated until the book/magazine is opened. Thus, contents of the microchip 202 are protected from nefarious interrogations (e.g., while on the shelf of a book store) while the book/magazine is closed.

In one embodiment of the present invention, the microchip 202 includes a hardware counter 325, as shown in FIG. 3. This hardware counter 325 counts how many times the microchip 202 is interrogated with requests for digital files from the digital files storage device 301. The microchip 202 also includes a disabling device 327, which disables the microchip 202 after the hardware counter 325 reaches a predetermined count. That is, assume that the receiving device 201 shown in FIG. 2 has requested digital files from the microchip 202 a total of 100 times. Assume further that there are 25 digital files (for one or more of the articles printed in the printed publication 200) stored in the digital files storage device 301. Thus, if all of the 25 digital files have been requested more than four times, or if a single digital file has been requested 100 times, or any other combination that leads to 100 downloads of the digital files from the microchip 202, then an assumption is made that the downloads are improper, and the disabling device 327 will disable all or part of the microchip 202. In one embodiment, this disabling is caused by sending an "erase" signal to the digital files storage device 301, thus clearing out all of the digital files stored therein. In another embodiment, the transceiver 307 is disabled, thus preventing any future downloads of the digital files to the receiving device 201 (or any other device).

In one embodiment of the present invention, a particular written article from the multiple written articles is related to two or more digital files from the multiple digital files. In this embodiment, the microchip 202 includes a profile receiving logic 329, which receives a profile of the user from the receiving device 209. For example, a profile of the current user may indicate that user's interests in various subjects/topics, including hobbies, his/her vocation, etc. A matching logic, such as profile matching logic 331, matches the particular written article to one of the two or more digital files based on the profile of the user.

Thus, assume that there are two video clips stored in the microchip 202 that relate to an article about Alaska. One of the video clips is about a person fly fishing, and another video clip is about shopping in Juneau. If the user's profile shows that this user is interested in fishing but not shopping, then the video clip about fly fishing, rather than the video clip about shopping, will be presented to that user when the receiving device 201 transmits a signal requesting a digital file from the microchip 202.

In one embodiment of the present invention, the printed publication (in one embodiment, the microchip 202), includes a global positioning system (GPS) hardware sensor 333, which utilizes the GPS satellite system to identify a physical location of the printed publication 200 in real time. Within the microchip 202 is a GPS comparison logic 335, which compares a real time position signal detected by the GPS hardware sensor 335 with a set of authorized locations (i.e., GPS locations stored within the GPS comparison logic 335). The microchip 202 also includes a GPS authorization logic 337. These components work together such that, in response to the GPS comparison logic 335 determining that the printed publication 200 is not currently at an authorize location, the GPS authorization logic 337 blocks the transceiver 307 from transmitting the relevant digital file from the microchip 209 to the receiving device 201. For example, assume that a book/magazine is on a shelf in a bookstore. Assume further that the GPS comparison logic 335 has the GPS location of this bookstore identified as an unauthorized GPS location. Thus, anyone trying to interrogate the microchip 202 while the book/magazine is still on the shelf of the bookstore (and thus unpurchased) will be prevented from doing so.

As mentioned above, in one embodiment of the present invention printed publication 200 (e.g., a book, magazine, etc.) has a spine 216 (depicted in FIG. 2), which binds the printed pages of the printed publication 200 together (e.g., by gluing, stitching, etc.). Affixed/attached to this spine 216 is a strain gauge 214, which detects which written article from the printed pages is currently visible to the user based on an amount of deflection to the spine when the printed publication is opened up. That is, as the printed publication 200 is turned to a different page from the pages 204, the spine 216 will flex in a known manner. By measuring how much the spine 216 flexes, the flex detector 309 is able to determine which page the book/magazine is opened to.

Figure 6:
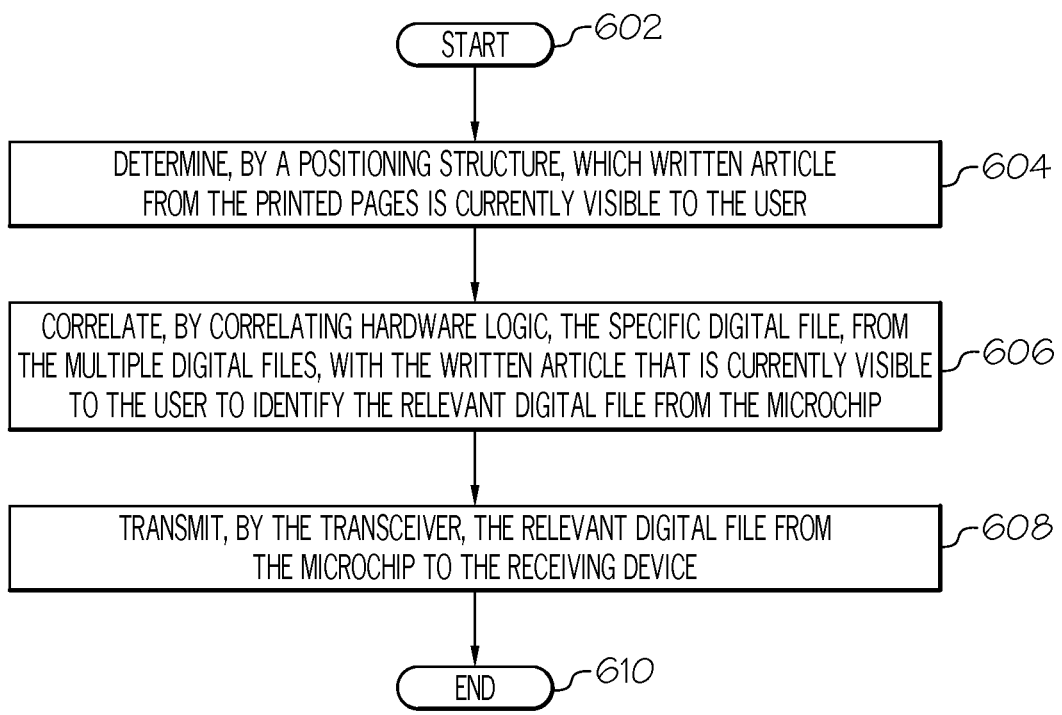
FIG. 6 is a high level flow chart of one or more steps performed by one or more hardware devices and/or processors to retrieve a digital file that is relevant to a written article in a printed publication.

With reference now to FIG. 6, a high level flow chart of one or more steps performed by one or more hardware devices and/or processors to retrieve a digital file that is relevant to a written article in a printed publication is presented. Note that in an exemplary embodiment and as described herein, multiple written articles are printed on one or more printed pages in a printed publication 200. The printed publication 200 comprises a positioning structure (e.g., element 404 from FIG. 4, element 503 from FIG. 5, and/or one or more of the elements depicted in FIG. 3), which enables a determination of which written article from the printed pages is currently visible to a user. A microchip 202 is affixed to the printed publication 200, wherein the microchip 202 holds multiple digital files, each of which is related to a specific written article from the multiple written articles. The microchip 202 also contains correlating hardware logic 305, which correlates a specific digital file, from the multiple digital files, with the written article that is currently visible to the user to identify a relevant digital file that is stored in the microchip 202. The microchip 202 also includes transceiver 307, which transmits the relevant digital file from the microchip 202 to a receiving device 201.

Thus, as shown in FIG. 6, after initiator block 602, a determination is made by the positioning structure as to which written article from the printed pages is currently visible to the user (block 604).

As described in block 606, the correlating hardware logic correlates the specific digital file, from the multiple digital files, with the written article that is currently visible to the user to identify the relevant digital file from the microchip.

As described in block 608, the transceiver in the microchip transmits the relevant digital file from the microchip to a receiving device, which has at least one of a video display and a speaker.

The flowchart ends at terminator block 610.

In one embodiment of the present invention and as described herein, the microchip comprises an EMF receiver, an EMF comparator for comparing a level of EMF radiation received at the microchip with a predetermined level of EMF radiation to determine how many multiple pages an initial EMF signal passed through, a page locator for utilizing a determined quantity of pages that the initial EMF signal passed through in order to identify the written article that is currently visible to the user, wherein at least one of the printed pages is coated with a coating of an electromagnetic field (EMF) shield, wherein the coating of the EMF shield allows a predetermined level of EMF radiation to pass through the coating. In this embodiment the method further comprises comparing, by the EMF comparator in the microchip, the level of EMF radiation received at the microchip with the predetermined level of EMF radiation to determine how many multiple pages the initial EMF signal passed through. The page locator then identifies the written article that is currently visible to the user, wherein the page locator utilizes the determined quantity of pages that the initial EMF signal passed through in order to identify the written article that is currently visible to the user.

In one embodiment of the present invention, the receiving device comprises an EMF transceiver, which is placed against a page on which the specific written article is printed. In this embodiment the method further comprises detecting, by the EMF transceiver that is placed against the page on which the specific written article is printed, a delay in time between the EMF transceiver sending an initial EMF signal to a reflector in the microchip and the EMF transceiver receiving a reflected EMF signal back from the microchip. The receiving device (e.g., a smart phone) then identifies a page on which the specific written article is printed based on the delay in time, thus enabling the microchip to retrieve the relevant digital file. That is, once the smart phone (or other receiving device) knows which page is being presented to the user, the smart phone can request the appropriate digital file from the microchip.

In one embodiment of the present invention, a printed symbol is printed on a printed page on which is printed the written article that is currently visible to the user (see FIG. 5). In this embodiment, the method further comprises receiving, by the microchip, an article identifier that has been identified by reading the printed symbol on the printed page on which is printed the written article that is currently visible to the user. The microchip then retrieves the relevant digital file based on the article identifier.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A printed publication comprising:
   a plurality of printed pages, wherein multiple written articles are printed on the printed pages;
   a microchip affixed to the printed publication, wherein the microchip comprises multiple digital files, wherein each of the multiple digital files is a digital file enhancer that is related to a specific written article from the multiple written articles;
   a positioning structure, wherein the positioning structure enables a positioning structure device to determine which printed page from the printed pages is currently visible to a user;
   a correlating hardware logic, wherein the correlating hardware logic correlates; and
   a transceiver, wherein the transceiver transmits the relevant digital file from the microchip to a receiving device, wherein the receiving device has at least one of a video display and a speaker.

2. The printed publication of claim 1, further comprising:
   a coating of an electromagnetic field (EMF) shield on at least one of the printed pages, wherein the coating of the EMF shield allows a predetermined level of EMF radiation to pass through the coating;
   an EMF receiver in the microchip;
   an EMF comparator in the microchip, wherein the EMF comparator compares a level of EMF radiation received at the microchip with a predetermined level of EMF radiation to determine how many multiple pages an initial EMF signal passed through; and
   a page locator device, wherein the page locator device utilizes a determined quantity of pages that the initial EMF signal passed through in order to identify the written article that is currently visible to the user.

3. The printed publication of claim 1, further comprising:
   a printed symbol on a printed page from the printed pages in the printed publication, wherein the printed symbol provides an article identifier of the written article that is currently visible to the user, and wherein the article identifier is transmitted to the microchip to retrieve the relevant digital file from the microchip.

4. The printed publication of claim 1, wherein an EMF transceiver is placed against a page on which the specific written article is printed, and wherein the method further comprises:
   an EMF reflector in the microchip, wherein a delay in time between the EMF transceiver sending an initial EMF signal to the microchip and the EMF transceiver receiving a reflected EMF signal back from the microchip identifies a page on which the specific written article is located, thus enabling the microchip to retrieve the relevant digital file.

5. The printed publication of claim 1, further comprising:
   a single-use authorization signal generator within the microchip, wherein the single-use authorization signal generator generates a single-use authorization signal that is transmitted to the receiving device; and
   an authorization hardware logic within the microchip, wherein the authorization hardware logic receives a combination signal from the receiving device, wherein the combination signal combines the single-use authorization signal with a unique identifier of the receiving device, and wherein the microchip releases data from the microchip only to the receiving device that has sent the combination signal.

6. The printed publication of claim 1, wherein the microchip contains only video files that are related to the multiple written articles.

7. The printed publication of claim 1, wherein the microchip contains only advertisements that are related to the multiple written articles.

8. The printed publication of claim 1, further comprising:
   a cover; and
   an electromagnetic field (EMF) shield affixed to the cover, wherein the EMF shield blocks EMF access to the microchip when the cover is closed.

9. The printed publication of claim 1, further comprising:
   a hardware counter within the microchip, wherein the hardware counter counts how many times the microchip is interrogated with requests for digital files; and
   a disabling device within the microchip, wherein the disabling device disables the microchip after the hardware counter reaches a predetermined count.

10. The printed publication of claim 1, wherein a particular written article from the multiple written articles is related to two or more digital files from the multiple digital files, and wherein the printed publication further comprises:
    a profile receiving logic, wherein the profile receiving logic receives a profile of the user from the receiving device; and
    a profile matching logic, wherein the profile matching logic matches the particular written article to one of the two or more digital files based on the profile of the user.

11. The printed publication of claim 1, further comprising:
    a global positioning system (GPS) hardware sensor, wherein the GPS hardware sensor identifies a location of the printed publication in real time;
    a GPS comparison logic within the microchip, wherein the GPS comparison logic compares a real time position signal from the GPS hardware sensor with a set of authorized locations; and
    a GPS authorization logic within the microchip, wherein in response to the GPS comparison logic determining that the printed publication is not currently at an authorized location, the GPS authorization logic blocks the transceiver from transmitting the relevant digital file from the microchip to the receiving device.

12. The printed publication of claim 1, further comprising:
    a global positioning system (GPS) hardware sensor, wherein the GPS hardware sensor identifies a location of the printed publication in real time;
    a GPS comparison logic within the microchip, wherein the GPS comparison logic compares a real time position signal from the GPS hardware sensor with a set of authorized locations; and a GPS authorization logic within the microchip, wherein in response to the GPS comparison logic determining that the printed publication is currently at an authorized location, the GPS authorization logic enables the transceiver to transmit the relevant digital file from the microchip to the receiving device.

13. The printed publication of claim 1, further comprising:
a spine, wherein the spine binds the plurality of printed pages together; and
a strain gauge attached to the spine, wherein the strain gauge detects which written article from the printed pages is currently visible to the user based on an amount of deflection to the spine when the printed publication is opened up.

14. A method of retrieving a digital file that is relevant to a written article, wherein multiple written articles are printed on one or more printed pages in a printed publication, wherein the printed publication comprises a positioning structure, wherein the positioning structure enables a determination of which page from the printed pages is currently visible to a user; wherein a microchip is affixed to the printed publication, wherein the microchip comprises: multiple digital files, wherein each of the multiple digital files is related to a specific written article from the multiple written articles; a correlating hardware logic, wherein the correlating hardware logic correlates a specific digital file, from the multiple digital files, with the written article on the printed page that is currently visible to the user to identify a relevant digital file from the microchip; and a transceiver, wherein the transceiver transmits the relevant digital file from the microchip to a receiving device; and wherein the method comprises:
determining, by the positioning structure, which written article from the printed pages is currently visible to the user;
correlating, by the correlating hardware logic, the specific digital file, from the multiple digital files, with the written article that is currently visible to the user to identify the relevant digital file from the microchip; and
transmitting, by the transceiver, the relevant digital file from the microchip to a receiving device, wherein the receiving device has at least one of a video display and a speaker.

15. The method of claim 14, wherein the microchip comprises an EMF receiver, an EMF comparator for comparing a level of EMF radiation received at the microchip with a predetermined level of EMF radiation to determine how many multiple pages an initial EMF signal passed through, a page locator for utilizing a determined quantity of pages that the initial EMF signal passed through in order to identify the written article that is currently visible to the user, wherein at least one of the printed pages is coated with a coating of an electromagnetic field (EMF) shield, wherein the coating of the EMF shield allows a predetermined level of EMF radiation to pass through the coating, and wherein the method further comprises:
comparing, by the EMF comparator in the microchip, the level of EMF radiation received at the microchip with the predetermined level of EMF radiation to determine how many multiple pages the initial EMF signal passed through; and
identifying, by the page locator, the written article that is currently visible to the user, wherein the page locator utilizes the determined quantity of pages that the initial EMF signal passed through in order to identify the written article that is currently visible to the user.

16. The method of claim 14, wherein the receiving device comprises an EMF transceiver, wherein the EMF transceiver is placed against a page on which the specific written article is printed, and wherein the method further comprises:
detecting, by the EMF transceiver that is placed against the page on which the specific written article is printed, a delay in time between the EMF transceiver sending an initial EMF signal to a reflector in the microchip and the EMF transceiver receiving a reflected EMF signal back from the microchip; and
identifying, by the receiving device, a page on which the specific written article is printed based on the delay in time, thus enabling the microchip to retrieve the relevant digital file.

17. A computer program product recorded in a tangible computer-readable medium for retrieving a digital file that is relevant to a written article, wherein multiple written articles are printed on one or more printed pages in a printed publication, wherein the printed publication comprises a positioning structure, wherein the positioning structure enables a determination of which printed page from the printed pages is currently visible to a user; wherein a microchip is affixed to the printed publication, wherein the microchip comprises: multiple digital files, wherein each of the multiple digital files is related to a specific written article from the multiple written articles; a correlating hardware logic, wherein the correlating hardware logic correlates a specific digital file, from the multiple digital files, with the written article that on the printed page is currently visible to the user to identify a relevant digital file from the microchip; and a transceiver, wherein the transceiver transmits the relevant digital file from the microchip to a receiving device; and wherein the computer program product comprises a compute readable storage medium having program code embodied therewith, the program code readable and executable by a processor to perform a method comprising:
determining, by the positioning structure, which written article from the printed pages is currently visible to the user;
correlating, by the correlating hardware logic, the specific digital file, from the multiple digital files, with the written article that is currently visible to the user to identify the relevant digital file from the microchip; and
transmitting, by the transceiver, the relevant digital file from the microchip to a receiving device, wherein the receiving device has at least one of a video display and a speaker.

18. The computer program product of claim 17, wherein the microchip comprises an EMF receiver, an EMF comparator for comparing a level of EMF radiation received at the microchip with a predetermined level of EMF radiation to determine how many multiple pages an initial EMF signal passed through, a page locator for utilizing a determined quantity of pages that the initial EMF signal passed through in order to identify the written article that is currently visible to the user, wherein at least one of the printed pages is coated with a coating of an electromagnetic field (EMF) shield, wherein the coating of the EMF shield allows a predetermined level of EMF radiation to pass through the coating, and wherein the method further comprises:
comparing, by the EMF comparator in the microchip, the level of EMF radiation received at the microchip with the predetermined level of EMF radiation to determine how many multiple pages the initial EMF signal passed through; and
identifying, by the page locator, the written article that is currently visible to the user, wherein the page locator utilizes the determined quantity of pages that the initial EMF signal passed through in order to identify the written article that is currently visible to the user.

19. The computer program product of claim 17, wherein a printed symbol is printed on a printed page on which is printed the written article that is currently visible to the user, and wherein the method further comprises:

receiving, by the microchip, an article identifier that has been identified by reading the printed symbol on the printed page on which is printed the written article that is currently visible to the user; and retrieving, by the microchip, the relevant digital file based on the article identifier.

20. The computer program product of claim 17, wherein the receiving device comprises an EMF transceiver, wherein the EMF transceiver is placed against a page on which the specific written article is printed, and wherein the method further comprises:

detecting, by the EMF transceiver that is placed against the page on which the specific written article is printed, a delay in time between the EMF transceiver sending an initial EMF signal to a reflector in the microchip and the EMF transceiver receiving a reflected EMF signal back from the microchip; and identifying, by the receiving device, a page on which the specific written article is printed based on the delay in time, thus enabling the microchip to retrieve the relevant digital file.

* * * * *